T. J. GEALE.
Device for Salting Meats.

No. 222,267.                Patented Dec. 2, 1879.

Witnesses:
J. W. Garner
Wm. W. Mortimer

Inventor:
Thos. J. Geale
per
Leman & Wilson,
attys.

UNITED STATES PATENT OFFICE.

THOMAS J. GEALE, OF CHICAGO, ILLINOIS, ASSIGNOR TO WILLIAM E. WEBBE AND JOHN W. GEALE, OF SAME PLACE, ONE-THIRD TO EACH.

IMPROVEMENT IN DEVICES FOR SALTING MEATS.

Specification forming part of Letters Patent No. 222,267, dated December 2, 1879; application filed September 17, 1879.

*To all whom it may concern:*

Be it known that I, THOMAS J. GEALE, of Chicago, in the county of Cook and State of Illinois, have invented certain new and useful Improvements in Devices for Salting Meats; and I do hereby declare the following to be a full, clear, and exact description of the invention, such as will enable others skilled in the art to which it pertains to make and use it, reference being had to the accompanying drawings, which form part of this specification.

My invention relates to an improvement in devices for salting meats; and it consists in a hollow pointed instrument, made in two parts, which is to be filled with salt, then closed so as to retain the salt, thrust into the meat, and then opened, so that as the instrument is withdrawn the salt will be left in the meat, as will be more fully described hereinafter.

Figure 1:
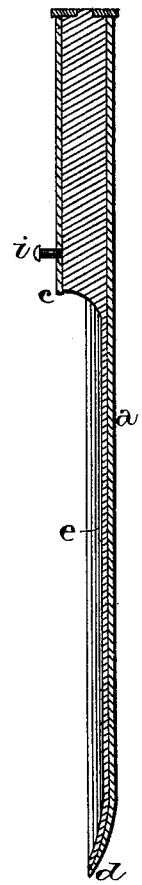
Figure 2:
Figure 3:
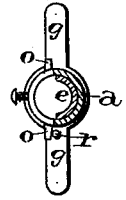
Figure 4:
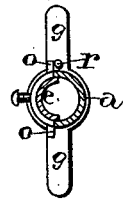

Figures 1 and 2 are vertical sections of my invention, showing the instrument both open and closed. Figs. 3 and 4 are horizontal sections of the same in the two positions.

*a* represents one part of the instrument, which is made tubular for a suitable distance at its upper end, and which has about one-half of its body, in cross-section, cut away from the point *c* to its end *d*. By thus cutting away one-half of the tube, as shown, a concave receptacle is formed, not only to receive the salt, but the whole lower portion of the other part, *e*, of the instrument. The end *d* is formed into a perforating and cutting point, so that it can be readily thrust into the meat, and the incline from the straight portion of the metal up to the end of the point is very gradual, so that the salt will drop freely out into the meat and not be retained in the instrument as it is being pulled out.

The second part, *e*, of the instrument is solid at its upper end, and fits snugly in the tubular part of the part *a*, and has the arm *g* secured to it for turning it one-half around in the part *a*, for the purpose of inclosing the salt preparatory to thrusting the instrument into the meat, and then opening the instrument before it is drawn out, so as to leave the salt behind. The whole lower part of part *e* corresponds in shape to the part *a*, so that when the two parts are ready to receive the salt, or are opened while in the meat to let the salt drop out, the part *e* fits snugly in the part *a*, as shown. After the salt has been placed in the concave formed by one or both parts *a e*, when either wholly or partially open, the part *e* is turned until its concave part just faces the concave portion of the part *a*, and thus a hollow sharp-pointed instrument is formed, which can be thrust into the meat without the salt being in any way exposed until the operator chooses to open the instrument to let it drop out.

Passing through the tubular portion of part *a* is a set-screw, *i*, by means of which the two parts of the instrument can be forced as closely together as may be desired, and thus prevent them from working loose.

To the outside of the upper end of part *a* are secured the two stops *o*, against which the projection *r* on the under side of the arm *g* catches, for the purpose of regulating the distance the part *e* shall turn both in opening and closing.

In order to prevent the instrument from turning around in the meat when the part *e* is being opened, the edges of the part *a* may be flared outward just enough to prevent the instrument from turning.

This instrument can also be used for sampling butter, cheese, flour, and other such articles.

Having thus described my invention, I claim—

A device for inserting salt in meats, consisting of the sharp part *a*, having a portion of its body cut away from *c* to *d*, in combination with the movable part *e*, placed in the part *a*, and provided with the arm *g* for turning it, substantially as shown and described.

In testimony that I claim the foregoing I have hereunto set my hand this 9th day of September, 1879.

THOMAS J. GEALE.

Witnesses:
HENRY W. LEMAN,
CHARLES S. WILSON.